United States Patent Office 2,939,477
Patented June 7, 1960

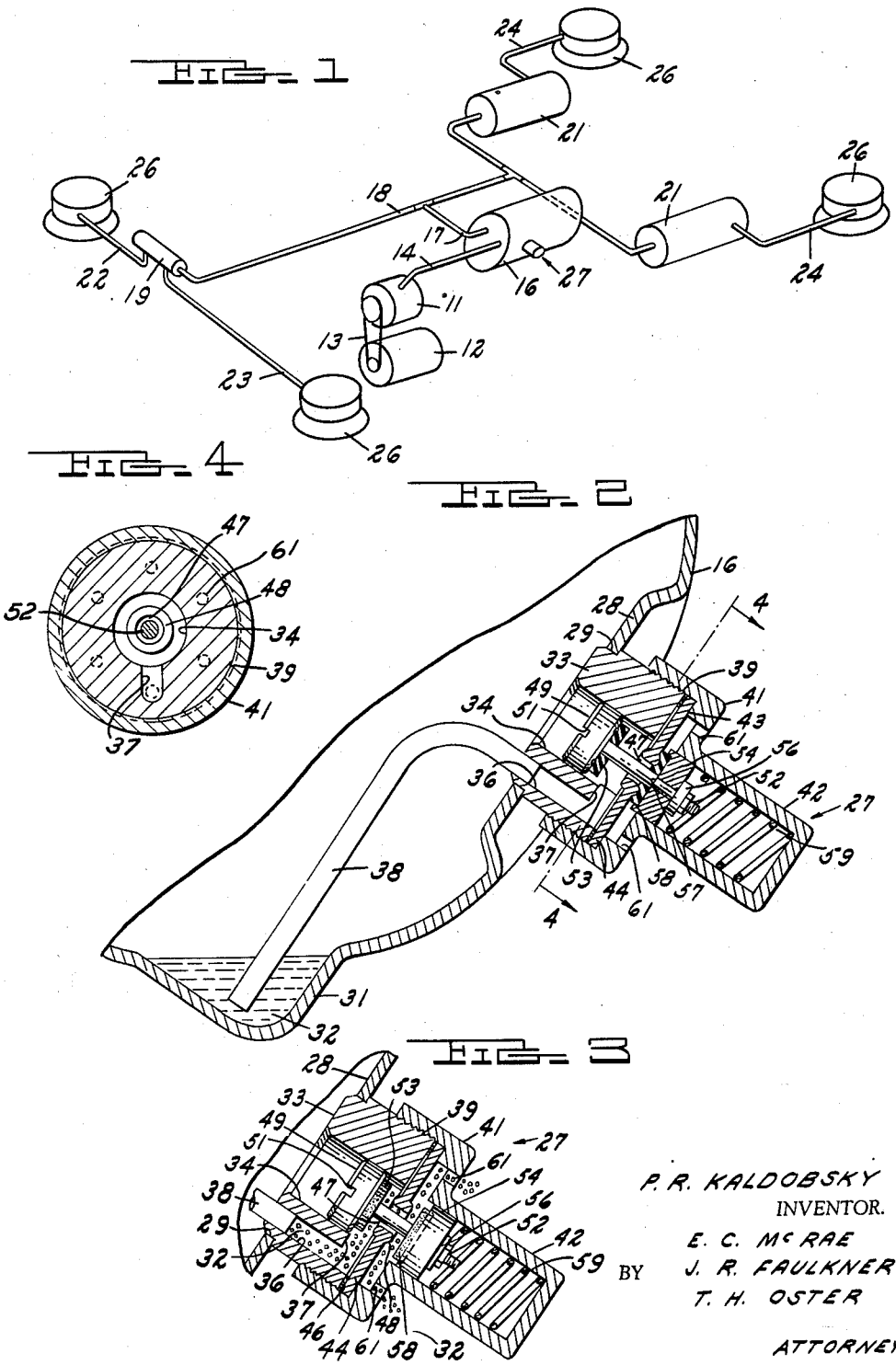

2,939,477
PRESSURE RELIEF AND WATER EXPULSION VALVE

Phoebus R. Kaldobsky, Farmington Township, Oakland County, Mich., assignor to Ford Motor Company, Dearborn, Mich., a corporation of Delaware Filed Dec. 13, 1956, Ser. No. 628,111

4 Claims. (Cl. 137—204)

This invention relates to a combination pressure relief and water expulsion valve and more particularly to a device which automatically expels condensation in a reserve tank of an air suspension system at periodic intervals.

Condensation unless purged from the system may cause trouble with the intricate valves required in an air suspension system. In the particular system in which the novel combination pressure relief and water expulsion valve is used, the compressor works at a capacity which is greater than the air reserve tank pressure requiring a blowoff valve to keep the pressure from going above the margin of safety of the reserve tank. In providing a valve for this purpose, the applicant has devised a valve in which water expulsion is accomplished each time the valve blows off. This valve can be located in any position on the reserve tank where it does not interfere with undercar or other clearances. A conduit extends from the valve toward the lowermost portion of the tank allowing air pressure to force water and/or compressor oil through the conduit and into the valve. When the required blowoff pressure is reached, the valve piston is forced outwardly venting the tank thus relieving pressure and expelling water and/or oil at the same time.

Other advantages and objects will become more apparent when considered in connection with the accompanying drawings in which:

Figure 1 is a schematic view of an air suspension system employing the applicant's novel valve;

Figure 2 is an enlarged cross sectional view of the applicant's valve secured to the air reserve tank wall;

Figure 3 is a similar view to Figure 2 and showing the valve in the process of a blowoff; and Figure 4 is a sectional view taken on the lines indicated as 4—4 of Figure 2.

Referring now to the drawings in detail, an air suspension system is shown generally in Figure 1 and may consist of an air compressor 11 which may be driven off the generator 12 as shown by a belt 13. A conduit 14 connects the compressor 11 to an accumulator or reserve tank 16. Air from the accumulator tank 16 is passed through air pipe 17 which junctures in T fashion to a generally longitudinal extending conduit 18 which serves the front and rear leveling valves indicated at 19 and 21 respectively. The leveling valves 19 and 21 are then connected to individual wheel air bags 26, shown in part, by conduits 22, 23 and 24.

The novel pressure relief and water expulsion valve is indicated generally at 27 and is shown in detail in Figures 2 through 4. This valve may be secured to the side of the air reserve tank 16 by the provision of a radial depression 28 having a central aperture 29. A water sump 31 may be provided at the lowermost part of the tank 16 for the collection of water and/or oil 32. Valve 27 is comprised of a cylindrical base 33 threadably joined or brazed to the aperture 29 and having a central axial bore 34 and an axially offset water and air passage 36 having an inwardly directed passage 37 providing access to the bore 34 at the end of the base 33. A generally L shaped exhaust tube 38 is secured in the passageway 36 and extends downwardly into the water sump 31. The base 33 is peripherally threaded at 39 to permit the threadable joinder of a cap 41 having a central hollowed projection 42 axially aligned with the central bore 34. Interposed between inside shoulder 43 of the cap 41 and the base 33 is an annular flange 44 and a gasket 46. The flange 44 is provided with a central enlarged aperture 47 which is characterized by an enlarged embossment 48 on each side of the flange and extending axially outwardly therefrom. The piston arrangement for the valve is made up of a piston 49 having a screw slot 51 on the face thereof for assembly purposes. Integral with the piston 49 and extending axially therefrom is a threaded stem 52 which extends through the aperture 47 and into the projection 42. A resilient annular seal 53 of a natural or synthetic elastomer is disposed about the stem and is bonded to the underside of the piston for contact with the embossment 48 on the annular flange. On the projection 42 side of the flange 44 is a dished annular guide member 54 secured by a washer and nut 56 against the shoulder 57 on the stem 52 of the piston. Guide member 54 effectively controls the alignment of the piston 49 and prevents "cocking" of the valve. A like resilient annular seal 58 is bonded to the face of the guide 54 for contact with the embossment 48 on the flange. A coil spring 59 is interposed between the end of the projection 42 and the guide member 54 urging the guide member inwardly and bottoming the seal 58 on the embossment 48 and thereby closing the aperture 47 to atmosphere. A plurality of spaced drain apertures 61 are provided in the cap 41 adjacent to the shoulder 43 through which vented air and water and/or oil are expelled into the atmosphere.

In actual operation the air compressor forces pressurized air into the reserve tank 16 which pressure works on any liquid in the system forcing it up through tube 38 into the area of the central bore 34. The spring 59 has a constant which resists the movement of the piston 49 until a predetermined pressure has been reached. At that time, the piston snaps axially outwardly blowing off the excess pressure and any water and/or oil which may be in the tank at the time of the blowoff. Because of the reduction in the reserve tank pressure, the piston 49 will be urged to its normal position by the spring 59 closing off the enlarged aperture 47 from atmosphere. A safety measure is incorporated in the system in that the failure of the spring 59 will result in the piston 49 moving axially outwardly bottoming the resilient seal 53 against the annular flange embossment 48 thus preventing the loss of reserve tank air.

It can thus be seen that the applicant has provided a novel yet simple valve mechanism which prevents the build-up of reserve tank pressure in excess of a predetermined pressure and in doing so automatically purges the system of liquids.

It will be understood that the invention is not to be limited to the exact construction shown and described, but that various changes and modifications may be made without departing from the spirit and scope of the invention, as defined in the appended claims.

What is claimed is:

1. A pressure relief and water expulsion valve in combination with a varying pressure air receptacle comprising a base with an axially extending central bore open at one end to the receptacle, a cap secured to the base at the other end, an apertured flange interposed between the base and the cap, a piston slidably engaging the central bore and a guide slidably mounted in said cap, a stem extending through the flange aperture and connecting the piston and the guide, spring means in said cap biasing the guide to contact said flange and sealingly cover the flange aperture access means in said base for the receptacle pressurized air and water to enter the central bore between the piston and the flange and means in the cap for exhausting said pressurized air and water to atmosphere when the increased receptacle air pressure forces the piston axially outwardly toward the flange and moving the guide axially outwardly away from the flange and allowing a predetermined amount of pressurized air and water to pass through the flange aperture and the exhausting means into the atmosphere whereupon said spring means will bias the guide axially inwardly to contact said flange.

2. The structure defined by claim 1 which is further characterized in that said access means comprises an axially extending air passage open to the receptacle at one end and to an inwardly directed passage at the other end, said last named passage intersecting the central bore adjacent the flange, and a conduit connected to the first named air passage and extending to the bottom of the receptacle.

3. A pressure relief and water expulsion valve in combination with an air suspension system having a compressor and a reserve tank connected to the compressor, comprising an internally bored base secured to the tank, a cap secured to the base, a flange provided with a central aperture interposed between the base and the cap, a piston positioned in the internal bore on the reserve tank side of the flange and having a stem end extend through the central aperture, a guide positioned in the cap and secured to the stem end, resilient sealing means secured to the piston and guide and adapted to engage the flange, spring means normally urging the guide sealing means to engage the flange and seal the control aperture, access means including a passageway spaced apart from said internal bore and communicating with the reserve tank and the internal bore adjacent to the flange permitting pressurized air and water into the internal bore, and at least one drain hole in the cap whereby a predetermined tank air pressure moves the piston to unseat the guide sealing means from engagement with said flange and permitting the escape of air and water into the atmosphere and subsequently sealing the central aperture by the piston sealing means engaging said flange and the subsequent decrease in air pressure permitting axial movement of the piston to unseat the piston sealing means from engagement with said flange and again seat the guide sealing means with said flange.

4. A pressure relief and liquid expulsion valve in combination with an air system having an air compressor and a varying pressure air tank having a depressed reservoir for the collection of liquid, comprising a base fixedly secured to the air tank and having a central axially extending bore, a hollowed cap secured to the base, an annular flange interposed between the cap and the base, a gasket interposed between the flange and the base, said flange having an enlarged aperture axially aligned with the central bore and provided with an arcuate embossment on each side of the flange, a piston slidably engaging the central bore, a stem integral with the piston and extending axially through the flange aperture and defining a radial pass-through space, a guide slidably mounted in said hollowed cap and fixedly secured to said stem, an annular seal of elastomeric properties bonded to the piston and guide respectively for engagement with the respective arcuate embossment on their side of the flange, a plurality of exhaust apertures spaced about the peripheral edge of the cap and connecting the cap on the guide side of the flange to atmosphere, a coiled spring biased between the cap and the guide and urging the guide seal into engagement with its respective flange embossment in a sealed manner, said base having an axially offset air passage generally parallel with the central bore and an inwardly directed passage connecting the axially offset passage with the central bore adjacent the flange, and an air-liquid intake tube secured in the axially offset passageway and extending into the depressed reservoir of the tank.

References Cited in the file of this patent

UNITED STATES PATENTS

| | | |
|---|---|---|
| 1,907,299 | Kudolla | May 2, 1933 |
| 2,591,432 | Hoerner | Apr. 1, 1952 |
| 2,739,605 | Smith | Mar. 29, 1956 |